(12) United States Patent
Farrell

(10) Patent No.: US 11,639,211 B2
(45) Date of Patent: May 2, 2023

(54) BICYCLE FRAME FOR AN E-BIKE

(71) Applicant: Paul Michael Farrell, Taichung (TW)

(72) Inventor: Paul Michael Farrell, Taichung (TW)

( * ) Notice: Subject to any disclaimer, the term of this patent is extended or adjusted under 35 U.S.C. 154(b) by 409 days.

(21) Appl. No.: 17/098,925

(22) Filed: Nov. 16, 2020

(65) Prior Publication Data
US 2021/0147032 A1 May 20, 2021

Related U.S. Application Data

(60) Provisional application No. 62/937,571, filed on Nov. 19, 2019.

(51) Int. Cl.
*B62K 19/34* (2006.01)
*B62M 6/90* (2010.01)
*B62K 3/08* (2006.01)

(52) U.S. Cl.
CPC .............. *B62K 19/34* (2013.01); *B62K 3/08* (2013.01); *B62M 6/90* (2013.01)

(58) Field of Classification Search
CPC ............. B62K 19/34; B62K 3/08; B62M 6/90
See application file for complete search history.

(56) References Cited

U.S. PATENT DOCUMENTS

| 11,052,961 B2* | 7/2021 | Hendey | B62K 19/34 |
| 11,124,258 B2* | 9/2021 | Hsu | B62M 3/003 |
| 11,345,437 B2* | 5/2022 | Talavasek | B62J 43/28 |

FOREIGN PATENT DOCUMENTS

EP  3590813 A1 *  1/2020  ............. B62J 43/13

* cited by examiner

*Primary Examiner* — John D Walters
(74) *Attorney, Agent, or Firm* — Schmeiser, Olsen & Watts LLP

(57) ABSTRACT

A bicycle frame is discussed having a battery fully contained within a down tube of the bicycle frame. The battery may be inserted into or removed from the down tube via a through opening through a bottom bracket housing of the bicycle frame. Weakness in the bottom bracket housing due to the through opening may be compensated for, fully or partially, by utilizing a bottom bracket bearing assembly that has a structural component, or structural component assembly, that extends completely through the bottom bracket housing and removably couples to the bottom bracket housing.

20 Claims, 7 Drawing Sheets

BICYCLE FRAME FOR AN E-BIKE

CROSS REFERENCE TO RELATED APPLICATION

This application claims priority to U.S. Provisional Patent Application to Paul Michael Farrell entitled "E-BIKE WITH CONCEALED BATTERY," Ser. No. 62/937,571, filed Nov. 19, 2019, the disclosures of which are hereby incorporated entirely herein by reference.

BACKGROUND OF THE INVENTION

Technical Field

This invention relates generally to bicycle frames for electric and/or electric-assist bicycles, and particularly to a bicycle frame with a battery that is fully concealed within the frame of the bicycle.

State of the Art

An electric bicycle, also known as an e-bike, is a bicycle with an integrated electric motor powered by a battery, which can be used for partial propulsion, while retaining the ability to be pedaled by the rider. The global market for e-bikes is growing rapidly due to riders with health issues, for use as an advanced training aid, to extend competitive cycling age, and for hill touring with a friend or spouse, for example.

Many non-electric bicycles, including common road bicycles and off-road bicycles, may be converted to e-bikes by adding an electric drive system, such as to the rear hub of the bicycle, and a separate battery and control system. Conventional e-bikes, whether converted or originally manufactured, have one or more of a number of problems. Some have batteries that are exposed or semi-exposed. Some may comprise covers or other battery containers that are unsightly and add additional bulk and unnecessary weight to the frame body. Such unsightliness may cause embarrassment to many serious cyclists. Some have batteries that are contained or semi-contained within the frame. However, these require either cutting the frame to create one or more access holes that weaken the frame, resulting in loss of frame stiffness or fatigue life, or they may require extension or other modification of the frame, such as moving the down tube forward and/or down from its traditional position immediately adjacent the bottom bracket, in order to provide for unhindered access to the battery. Any of these configurations may negatively affect the handling, structural integrity, aerodynamics and/or the aesthetic pleasantry of the frame. For at least any of these reasons, many cyclists, including many serious road cyclists, are dis-inclined to ride conventional e-bikes.

Accordingly, what is needed is an improved frame for an e-bike with a fully concealed battery integrated into the frame of the bicycle without compromising the structural integrity of the frame.

SUMMARY OF THE INVENTION

The disclosed invention relates to bicycles, and particularly to an electric-assist bicycle with a fully concealed battery integrated into the frame of the bicycle without compromising the structural integrity of the frame.

Disclosed is a bicycle frame for an e-bike frame, which includes a through opening through a bottom bracket housing of the bicycle frame. Ordinarily, such a through opening through the bottom bracket housing would significantly weaken the bottom bracket housing and the bicycle frame. However, such weakness is overcome in the disclosed bicycle frame by use of a bearing assembly comprising a fully structural component, or structural component assembly, that extends through the length of the bottom bracket housing along the longitudinal axis thereof, to provide the needed strength and durability to compensate for any weakness in the bottom bracket housing due to the through opening. The through opening through the bottom bracket housing provides access to a battery cavity within the down tube. The through opening provides for insertion of a battery into the battery cavity of the down tube or removal of the battery therefrom, when the bearing assembly is removed from the frame. Once the battery is inserted into the battery cavity of the down tube through the through opening, the battery remains stored within the down tube while in use. A battery access cover may be removably coupled to the frame to cover the through opening.

Some embodiments may further comprise a charging port for charging the battery without the need of removing the battery. Wiring utilized for such electrical communications between the battery and/or a control panel/controls, and/or an electric drive motor, may be contained within the frame, thereby concealing them from view while in use.

Disclosed is bicycle frame that includes a down tube with a battery cavity, a battery positioned within the battery cavity, a bottom bracket housing coupled to the down tube, and a bottom bracket bearing assembly extended through and removably coupled to the bottom bracket housing. In some embodiments, the down tube includes a hollow down tube shell having a down tube first end, a down tube second end opposing the down tube first end, the battery cavity inside the hollow down tube shell, and a down tube longitudinal axis that extends from the down tube first end to the down tube second end. The battery is positioned inside the battery cavity. In some embodiments, the bottom bracket housing is coupled to the down tube second end. In some embodiments, the bottom bracket housing includes a hollow cylindrical shaped housing shell having a housing first end, a housing second end opposing the housing first end, a bearing cavity inside the housing shell, and a housing shell longitudinal axis that extends from the housing first end to the housing second end. The housing shell longitudinal axis is perpendicular to the down tube longitudinal axis, and the bearing cavity opens to the battery cavity. A bottom bracket bearing assembly is extended through and removably coupled to the bottom bracket housing. The bottom bracket bearing assembly prevents the battery from exiting the battery cavity in response to the bottom bracket bearing assembly being coupled to the bottom bracket housing.

The foregoing and other features and advantages of the invention will be apparent from the following more detailed description of the particular embodiments of the invention, as illustrated in the accompanying drawings.

BRIEF DESCRIPTION OF THE DRAWINGS

A more complete understanding of the disclosed inventions may be derived by referring to the detailed description and claims when considered in conjunction with the Figures, wherein like reference numbers refer to similar items throughout the Figures, and:

DETAILED DESCRIPTION OF EMBODIMENTS OF THE INVENTION

As discussed above, embodiments of the disclosed invention relate to electric and/or electric-assist bicycles, and particularly to a bicycle frame for an electric bicycle with a battery that is fully concealed within the frame of the bicycle without modification of the frame.

The bicycle frame of a disclosed e-bike, in a disclosed configuration, includes a top tube, a head tube, forks, a down tube, a seat tube, seat stays, chain stays, and a bottom bracket shell, coupled together to form a conventional double triangle bike frame configuration, wherein a main triangle is defined by the top tube, down tube, and seat tube, and a paired rear triangle is defined by the seat tube, seat stays, and chain stays. The down tube, seat tube, and chain stays converge at a bottom bracket housing, which serves as a critical junction requiring significant strength and durability to withstand significant loads and impact forces acting thereon while in use. In the disclosed invention, the bottom bracket housing also serves as a housing for a crankset bearing assembly. In embodiments of the disclosed invention, the down tube is hollow, and the bottom bracket housing is hollow. A battery is inserted through a through hole in the bottom bracket housing into a battery cavity inside the down tube. A bottom bracket bearing assembly is extended through and removably coupled to the bottom bracket housing. The bottom bracket bearing assembly keeps the battery inside the down tube and adds structural stability to the bicycle frame and the down tube.

Figure 1:
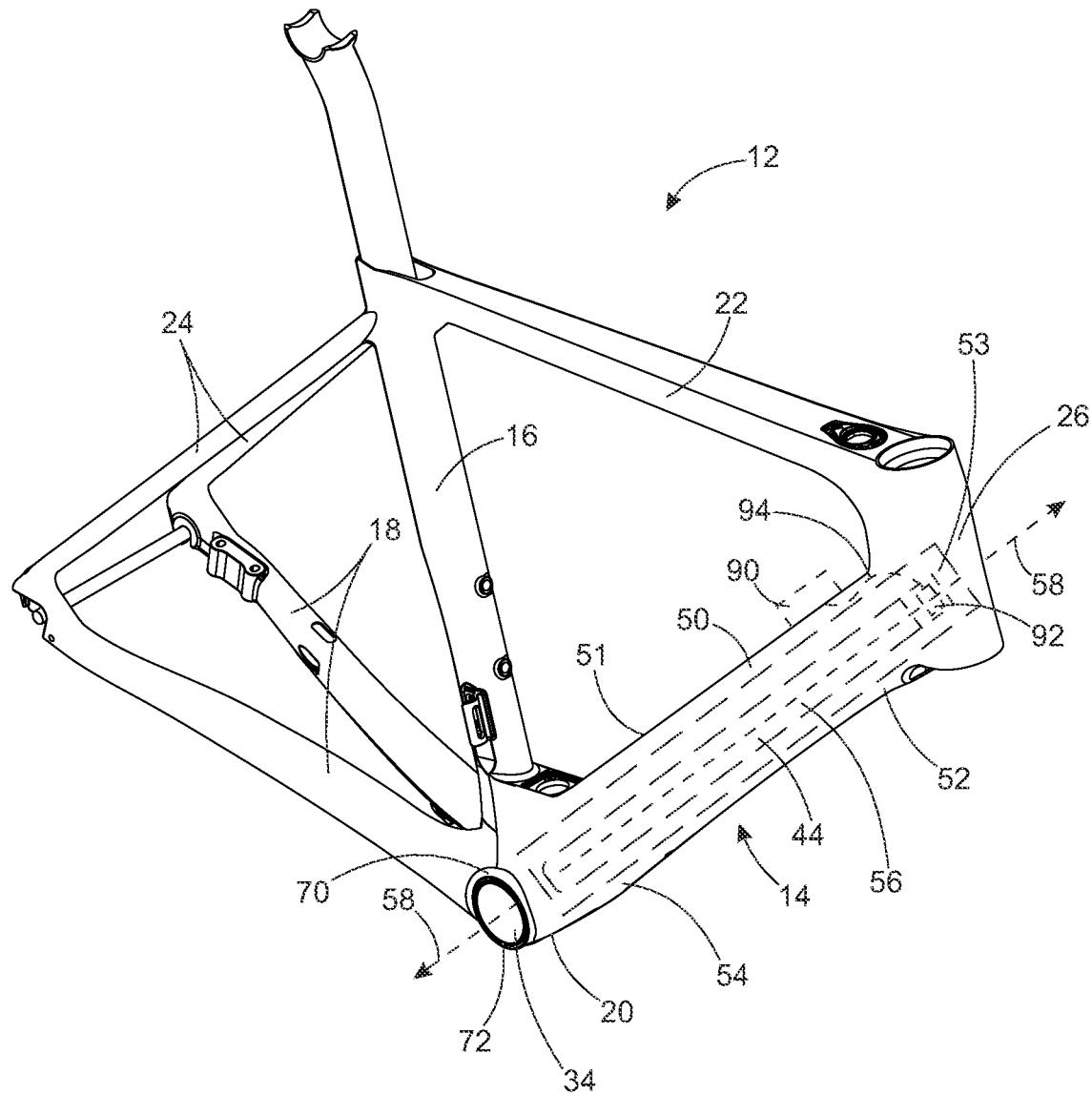
FIG. 1 is a perspective view of a bicycle frame, according to an embodiment.
Figure 2:
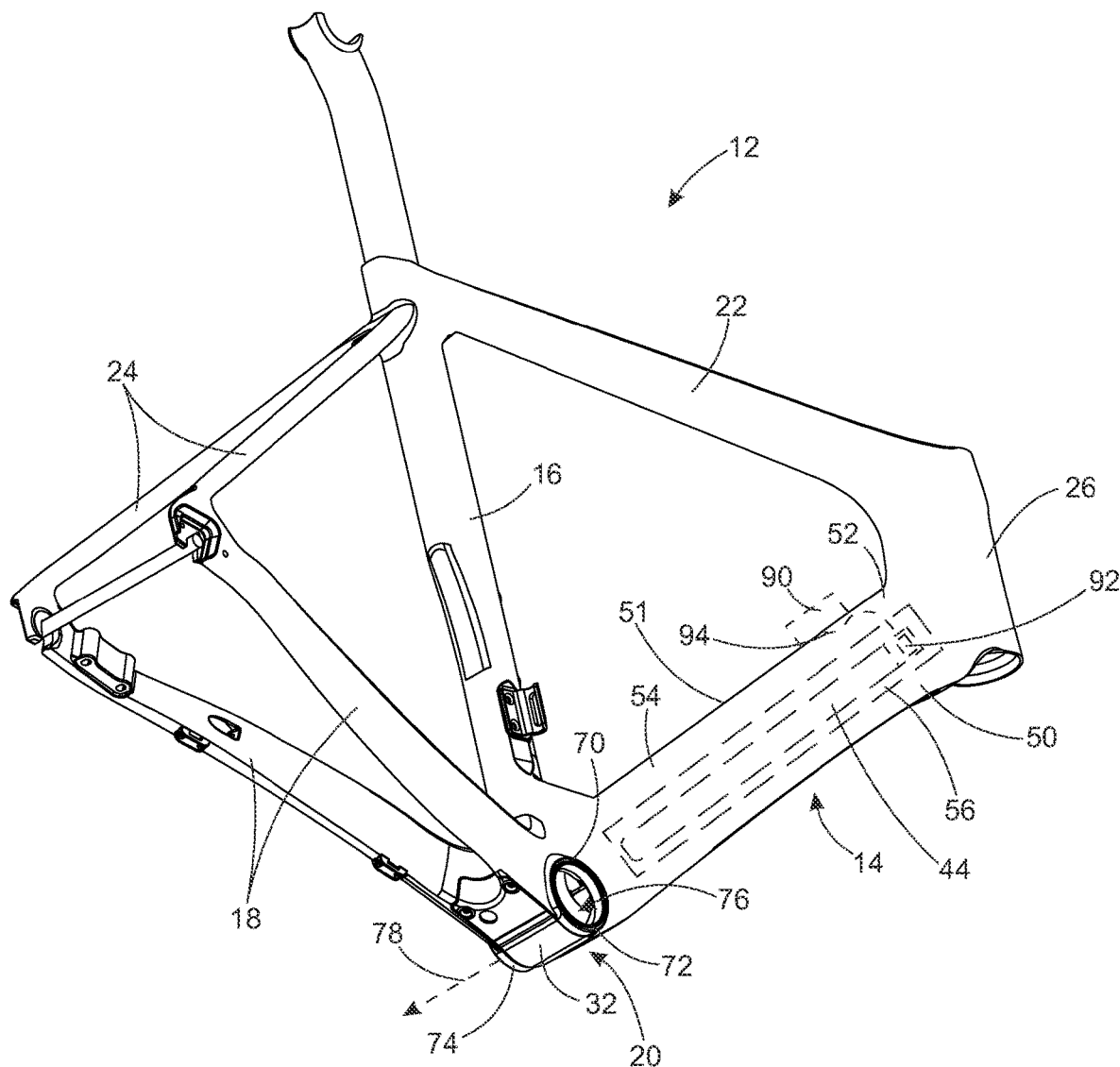
FIG. 2 is another perspective view of the bicycle frame of FIG. 1.
Figure 3:
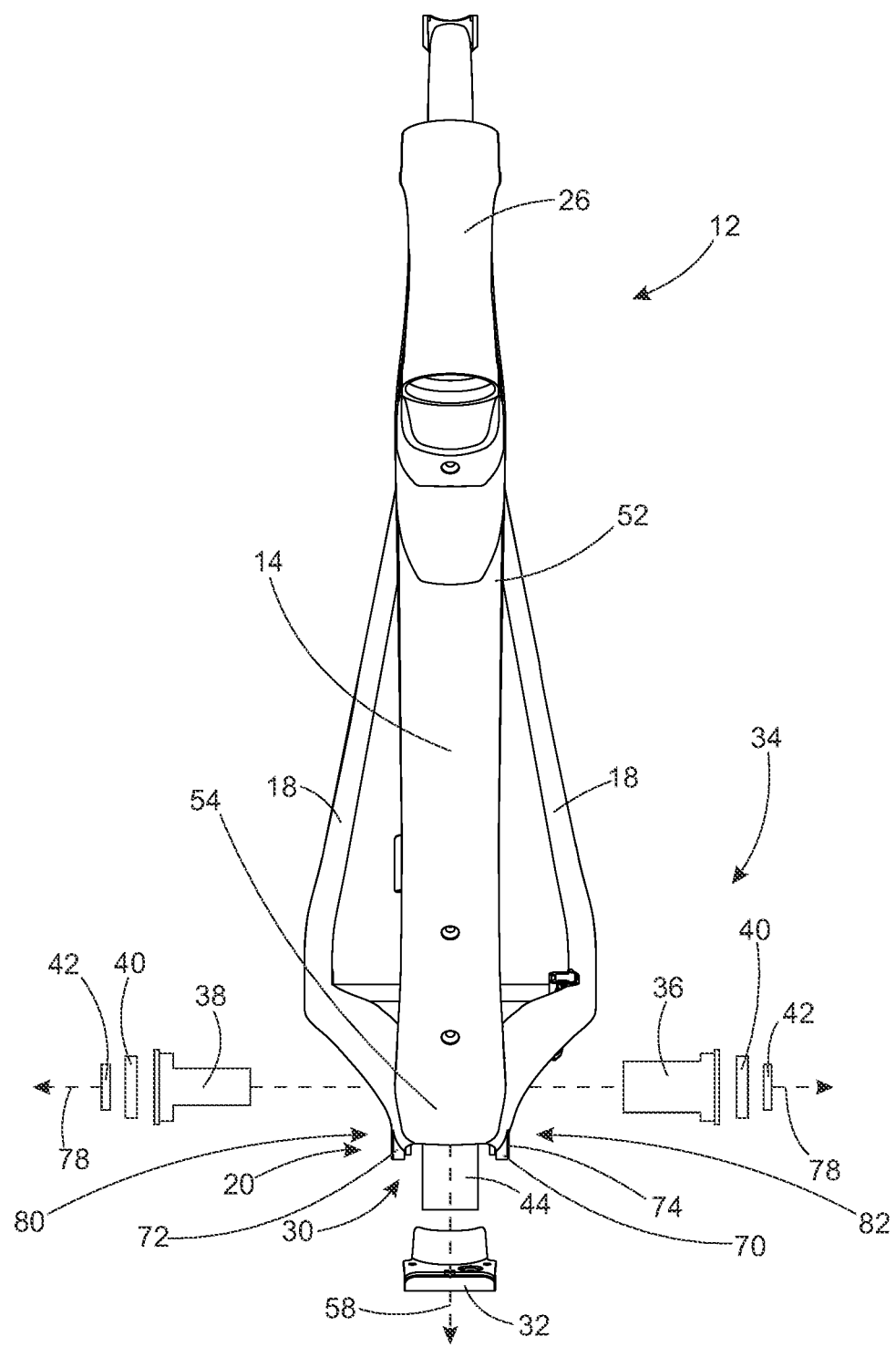
FIG. 3 is an exploded view of a portion of the bicycle frame of FIG. 1, showing details of a bottom bracket bearing assembly.
Figure 4:
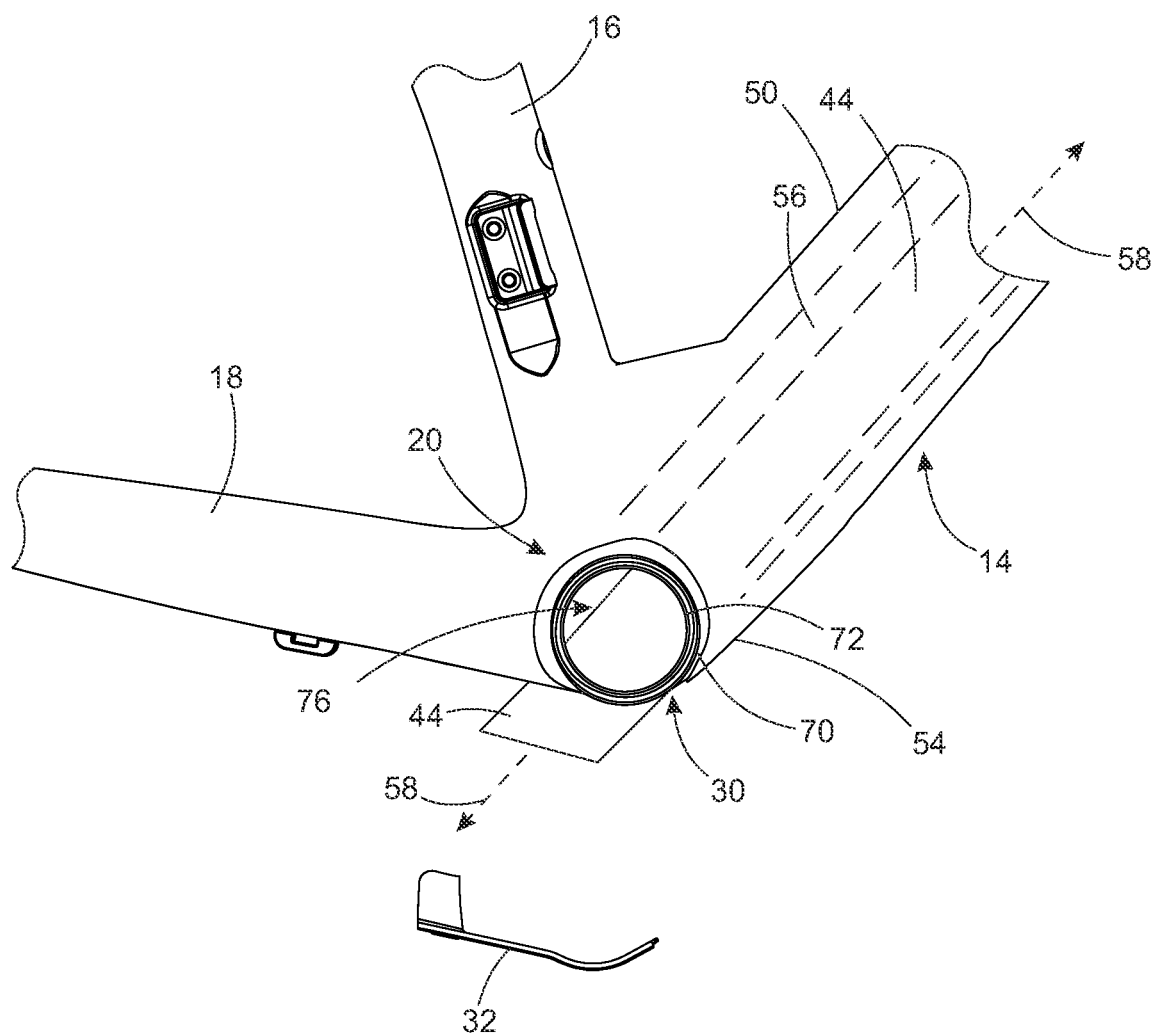
FIG. 4 is a side view of a portion of the bicycle frame of FIG. 1, showing details of the bottom bracket housing, wherein a battery is partially inserted into a through opening through the bottom bracket housing and into the down tube, and wherein a battery access cover is removed, according to an embodiment.
Figure 5:
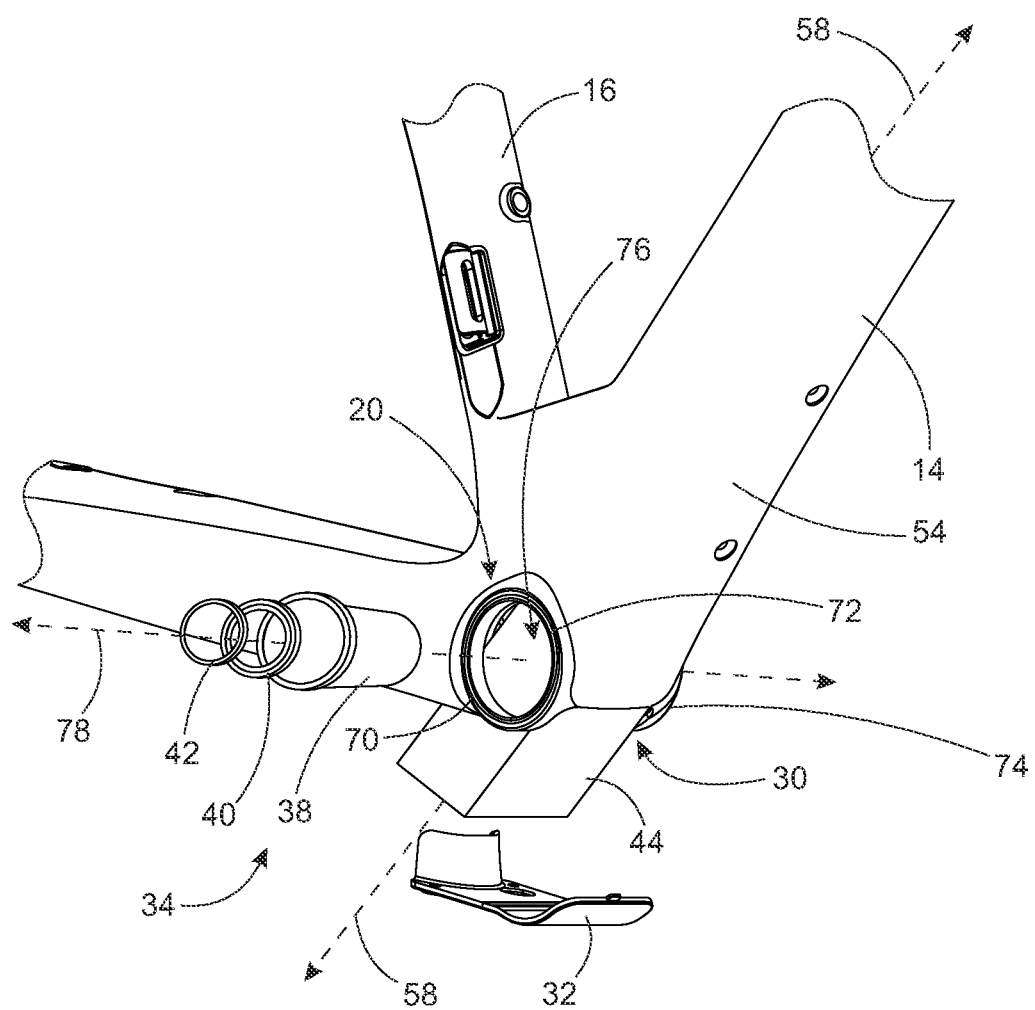
FIG. 5 is a side perspective exploded view of a portion of the bicycle frame of FIG. 1, showing details of the bottom bracket housing and bottom bracket bearing assembly, wherein a battery is partially inserted into a through opening through the bottom bracket and into the down tube, and wherein a battery access cover is removed, according to an embodiment.
Figure 6:
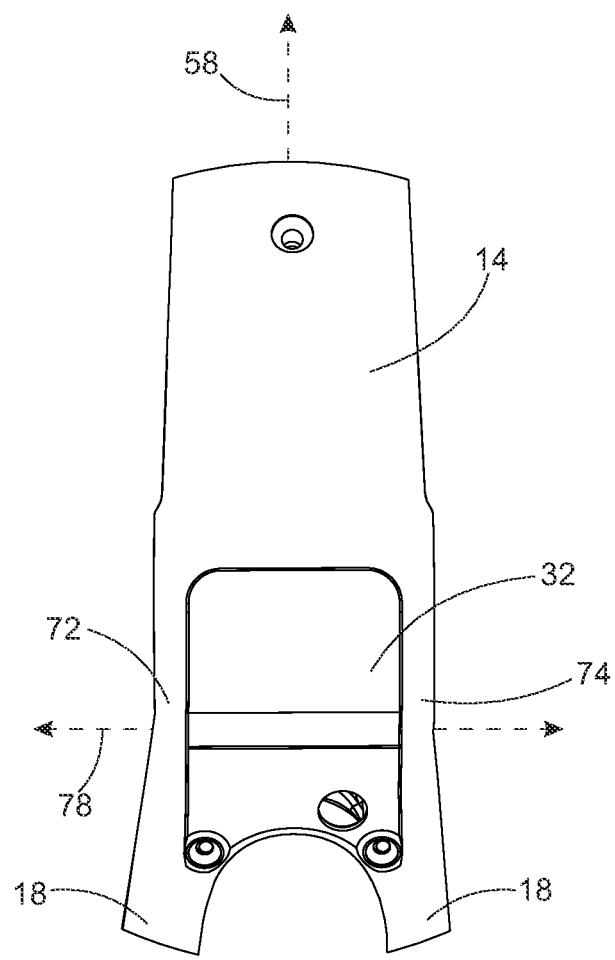
FIG. 6 is a bottom view of a portion of the bicycle frame of FIG. 1, showing details of the bottom bracket housing, wherein the battery access cover is removably coupled thereto, according to an embodiment.

Referring to the drawings, FIGS. 1 and 2 show two perspective views of a bicycle frame 12. FIG. 3 shows a front end view of bicycle frame 12. FIG. 4 shows a close-up side view of a bottom bracket housing 20 of bicycle frame 12. FIG. 5 shows a perspective close-up view of bottom bracket housing 20 with battery 44 inserted through bottom bracket housing 20 and partially inserted into a battery cavity 56 of down tube 14. FIG. 6 shows a close-up bottom view of bottom housing 20 showing a battery access cover 32 covering a through opening 30 into bottom bracket housing 20.

Bicycle frame 12, in the embodiment shown in the figures, includes a top tube 22, a head tube 26, a down tube 14, a seat tube 16, a pair of seat stays 24, a pair of chain stays 18, and bottom bracket housing 20, coupled together as shown in the drawings. When coupled together as in the embodiment shown in the figures, these components form a double triangle bike frame configuration, which is a common conventional bike frame configuration, wherein a main triangle is defined by top tube 22, down tube 14, and seat tube 16, and a paired rear triangle is defined by seat tube 16, seat stays 24, and chain stays 18. Often a fork steerer tube is extended through head tube 26 with bicycle forks coupled to the fork steerer tube. Seat tube 16 is coupled to bottom bracket housing 20, and top tube 22 is coupled to seat tube 16 and head tube 26.

As shown in FIGS. 1 and 2, down tube 14, seat tube 16, and chain stays 18 converge at bottom bracket housing 20. Bottom bracket housing 20 serves as a critical junction point requiring significant strength and durability to withstand significant loads and impact forces acting thereon while in use.

Down tube 14 is hollow. Down tube 14 includes a hollow down tube shell 50 having a down tube first end 52 and a down tube second end 54 opposing down tube first end 52. Down tube first end 52 is coupled to head tube 26. Down tube second end 54 is coupled to bottom bracket housing 20. Down tube 14 has a battery cavity 56 inside hollow down tube shell 50. A battery 44 is positioned inside battery cavity 56, as shown in FIG. 1 and FIG. 2. Battery 44 is enclosed in down tube 14. Down tube 14 has a down tube longitudinal axis 58 that extends from down tube first end 52 to down tube second end 54.

Bottom bracket housing 20 of bicycle frame 12 is coupled to down tube second end 54. Bottom bracket housing 20 is hollow. Bottom bracket housing 20 includes a hollow cylindrical shaped housing shell 70, best seen in FIG. 2 and FIG. 5. Hollow cylindrical shaped housing shell 70 has a housing first end 72 and a housing second end 74 opposing housing first end 72. Hollow cylindrical shaped housing shell 70 is open at each end, with a first bearing opening 80 in housing first end 72, and a second bearing opening 82 in housing second end 74 (FIG. 3). Bearing cavity 76 (FIG. 2) is inside hollow cylindrical shaped housing shell 70. Bearing cavity 76 is open to battery cavity 56 so that battery 44 can slide through bearing cavity 76 of hollow cylindrical shaped shell 70 and into battery cavity 56 of down tube 14. Bottom bracket housing 20 has a housing shell longitudinal axis 78 that extends from housing first end 72 to housing second end 74 as shown in FIG. 2, FIG. 3, FIG. 5 and FIG. 6. Housing shell longitudinal axis 78 is perpendicular to down tube longitudinal axis 58.

Bottom bracket housing 20 serves as a housing for a bottom bracket bearing assembly 34, best seen in FIG. 3. Bottom bracket bearing assembly 34 extends through and is removably coupled to bottom bracket housing 20. Bottom bracket bearing assembly 34 serves at least two purposes: first, to keep battery 44 from exiting down tube 14 and bottom bracket housing 20; and second, to provide structural stability and strength to bicycle frame 12.

Bottom bracket housing 20 has three openings into bearing cavity 76. First bearing opening 80 and second bearing opening 82 oppose each other at housing first end 72 and housing second end 74, respectively, as seen in FIG. 2 and FIG. 3, for example. Bottom bracket housing 20 of bicycle frame 12 also has a through opening 30, as shown in FIG. 3, FIG. 4, and FIG. 5. Through opening 30 is the opening that battery 44 is inserted through to extend through bearing cavity 76 of bottom bracket housing 20 and into battery cavity 56 of down tube 14, as shown in the figures. When bottom bracket bearing assembly 34 is not installed in bottom bracket housing 20, battery 44 is installed and removed from battery cavity 56 through bottom bracket housing 20 and specifically through the through opening 30. Once battery 44 is inserted into through opening 30, through bearing cavity 76 of bottom bracket housing 20 and into battery cavity 56, bottom bracket bearing assembly 34 is inserted through bottom bracket housing 20 and removably coupled to bottom bracket housing 20. Bottom bracket bearing assembly 34 prevents battery 44 from exiting (being removed from) battery cavity 56 in down tube 14 once bottom bracket bearing assembly 34 is extended through, and coupled to, bottom bracket housing 20.

Ordinarily, a through opening 30 through bottom bracket housing 20 would significantly weaken bottom bracket housing 20, rendering it ineffective. However, such weakness is overcome by the use of bottom bracket bearing assembly 34. Bottom bracket bearing assembly 34 is extended through the entire length of bottom bracket housing 20 along housing shell longitudinal axis 78. Bottom bracket bearing assembly 34 extending through the entire length of bottom bracket housing 20 and coupled to bottom bracket housing 20 provides the additional needed strength and durability to compensate for any weakness in bottom bracket housing 20 due to through opening 30.

Bottom bracket bearing assembly 34 is inserted into bottom bracket housing along housing shell longitudinal axis 78. Bottom bracket bearing assembly 34 can take many different forms of bottom bracket assemblies, as is know in the art of bearing assemblies for bicycles. In the embodiment shown in the figures, bottom bracket bearing assembly 34 includes a male bearing cup 38, a female bearing cup 36, a pair of bearings 40, and a pair of outer seals 42, as best seen in FIG. 3. Male bearing cup 38 is inserted into bearing cavity 76 through first bearing opening 80 along housing shell longitudinal axis 78 of bottom bracket housing 20. Female bearing cup 36 is inserted into bearing cavity 76 through second bearing opening 82 along housing shell longitudinal axis 78 of bottom bracket housing 20. Male bearing cup 38 and female bearing cup 36 meet in bearing cavity 76, and are coupled to each other, either by press fit or threads or other coupling method. Bearings 40 and outer seals 42 are coupled to male bearing cup 38 and female bearing cup 36 as is known in the art. Coupling male bearing cup 38 to female bearing cup 36 couples bottom bracket bearing assembly 34 to bottom bracket housing 20.

Bottom bracket bearing assembly 34 may be a BB386 bottom bracket bearing system, a PF30 bottom bracket bearing system, or the like, wherein the complete bearing system comprises a structural component, or structural component assembly, such as a through sleeve, whether threaded or not threaded, a pair of mating threaded sleeves or cups, or the like, that extend through the length of the bottom bracket housing 20 along the housing shell longitudinal axis 78. Bottom bracket bearing assembly 34 extends through the length of the bottom bracket housing 20 and provides the needed strength and durability to compensate for weakness in bottom bracket housing 20 due to through opening 30. In some embodiments, bottom bracket bearing assembly 34 may comprise a single structural component that extends through the length of bottom bracket housing 20. In any case, bottom bracket bearing assembly 34 is removably coupled to bottom bracket housing 20.

With bottom bracket bearing assembly 34 removed from bottom bracket housing 20, battery 44 may be inserted into or removed from battery cavity 56 of down tube 14 through the bearing cavity 76 and through opening 30. Once battery 44 is inserted into battery cavity 56 of down tube 14, battery 44 remains fixed and stored within down tube 14.

Bicycle frame 12 also includes a battery access cover 32. Battery access cover 32 is removably coupled to bottom bracket housing 20. Battery access cover 32 covers through opening 30. Battery access cover 32 may be configured to be friction fit to bicycle frame 12, or it may be configured to be removably coupled to bicycle frame 12 by any other suitable means including, without limitation, mechanically by screws, rivets, bolts, other fastener devices, or the like. In some embodiments, as shown in FIG. 6, battery access cover 32 is removably coupled to bicycle frame 12, with battery access cover 32 shaped to conform to the exterior surface of bottom bracket shell 20, chain stays 18, and/or seat tube 16, with which it may be in contact.

In some embodiments, bicycle frame 12 includes a charging system for charging battery 44. In the embodiment shown in the figures, bicycle frame 12 includes an optional charging port 90, charging connector 92, and charging electrical connection 94. Charging port 90 is coupled to a down tube outside surface 51 of down tube 14. Charging connector 92 is coupled to a down tube inside surface 53 of down tube 14. Charging connector 92 is electrically coupled to battery 44 in response to battery 44 being inserted into battery cavity 56. Charging connector 92 is electrically coupled to charging port 90 with an electrical connection 94, as shown in FIG. 1 and FIG. 2. Charging port 90, charging connector 92, and electrical connection 94 are shown in dotted lines because they are optional components. When power is provided to charging port 90 and battery 44 is electrically connected to charging connector 92, battery 44 is charged. Furthermore, in some embodiments, battery 44 may be in wired or wireless communication with a control panel, and/or controls, (not shown) and an electric drive motor (not shown). In some embodiments, any wiring utilized for such electrical communications may be contained, at least primarily, within bicycle frame 12, thereby concealing them from view while in use.

Although battery 44 of the disclosed bicycle frame is contained within down tube 14 in the embodiment shown in the figures, it is contemplated that battery 44, or batteries 44, may be alternatively contained within seat tube 16 and/or chain stay(s) 18 or other portions of bicycle frame 12 without departing from the spirit of the teachings herein. In such alternative embodiments, battery access is via through opening 30 through bottom bracket shell 20, wherein any weakness of bottom bracket housing 20 due to through opening 30 therethrough is compensated for, fully or partially, by bottom bracket bearing assembly 34 comprising a structural component, or structural component assembly, extending through bottom bracket shell 20, as described above.

It is also contemplated that the disclosed invention, in some embodiments, is not limited to a double triangle frame configuration, as shown in the drawings and described above. The teachings of the disclosed bicycle frame may be equally applied to various other bicycle frame configurations, including, without limitation, certain diamond, step-through, cantilever, recumbent, prone, cross or girder, truss, monocoque, or tandem frames, or the like, whether for road use or off-road use, or any combination thereof.

Because access to battery 44 is via through opening 30 through bottom bracket housing 20, there is no need to cut a battery access hole in down tube 14, alter the connection point where down tube 14 is coupled to bottom bracket housing 20, or otherwise alter the geometry of bicycle frame 12, including tube angles and lengths, and/or frame shapes, to accommodate battery 44, thereby maintaining the strength, integrity, and geometry of bicycle frame 12. The disclosed bicycle frame 12 eliminates the unsightliness of batteries that are coupled to the frame exterior, or only partially inserted into a component of bicycle frame 12, because battery 44 is fully contained within bicycle frame 12, thereby maintaining the aesthetic pleasantry and aerodynamic properties of bicycle frame 12.

The components defining bicycle frame 12 may be formed of any of many different types of materials or combinations thereof that can readily be formed into shaped objects provided that the components selected are consistent with the intended operation of bicycle frame 12. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as copper, zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining bicycle frame 12 may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, sewing, any combination thereof, and/or the like for example, depending on, among other considerations, the particular material forming the components. Other possible steps might include sand blasting, polishing, powder coating, zinc plating, anodizing, hard anodizing, and/or painting the components for example.

In the embodiments of bicycle frame 12 shown in the figures, bottom bracket housing 20 is formed to be a structural element in order to reinforce the stiffness of bottom bracket housing 20 and bicycle frame 12 once through hole 30 is formed in bottom bracket housing 20. However, bicycle frame 12 can be reinforced by many different methods. In some embodiments of bicycle frame 12, bottom bracket housing 20 is not a structural element. In some embodiments of bicycle frame 12, layers of composite are added to hollow down tube shell 50 to make bicycle frame 12 stronger. In some embodiments of bicycle frame 12, layers of composite are added to chain stays 18 to make bicycle frame 12 stronger. In some embodiments of bicycle frame 12, layers of composite are added to seat tube 16 to make bicycle frame 12 stronger. In some embodiments of bicycle frame 12, layers of composite are added to top tube 22 to make bicycle frame 12 stronger.

In some embodiments of bicycle frame 12, the walls of one or more than one of the components of bicycle frame 12 can be made thicker than usual to increase the structural strength of bicycle frame 12. Bicycle frame 12 and its elements can be formed of steel, or an alloy, or any other suitable compound. In some embodiments of bicycle frame 12, the walls of hollow down tube shell 50 are made thicker than normal to increase the structural strength of down tube 14. In some embodiments of bicycle frame 12, the walls of seat tube 16 are made thicker than normal to increase the structural strength of seat tube 16. In some embodiments of bicycle frame 12, the walls of chain stays 18 are made thicker than normal to increase the structural strength of chain stays 18. In some embodiments of bicycle frame 12, the walls of seat stays 24 are made thicker than normal to increase the structural strength of seat stays 24. In some embodiments of bicycle frame 12, the walls of top tube 22 are made thicker than normal to increase the structural strength of top tube 22.

In some embodiments of bicycle frame 12, the walls of one or more than one of the components of bicycle frame 12 can be made stronger by using a composite fiber material for the walls, or any other type of high-strength material or composite. This is done to increase the structural strength of bicycle frame 12. In some embodiments of bicycle frame 12, the walls of hollow down tube shell 50 are made stronger than normal by using a high-strength material or composite to increase the structural strength of down tube 14. In some embodiments of bicycle frame 12, the walls of seat tube 16 are made stronger than normal by using a high-strength material or composite to increase the structural strength of seat tube 16. In some embodiments of bicycle frame 12, the walls of chain stays 18 are made stronger than normal by using a high-strength material or composite to increase the structural strength of chain stays 18. In some embodiments of bicycle frame 12, the walls of seat stays 24 are made stronger than normal by using a high-strength material or composite to increase the structural strength of seat stays 24. In some embodiments of bicycle frame 12, the walls of top tube 22 are made stronger than normal by using a high-strength material or composite to increase the structural strength of top tube 22.

Figure 7:
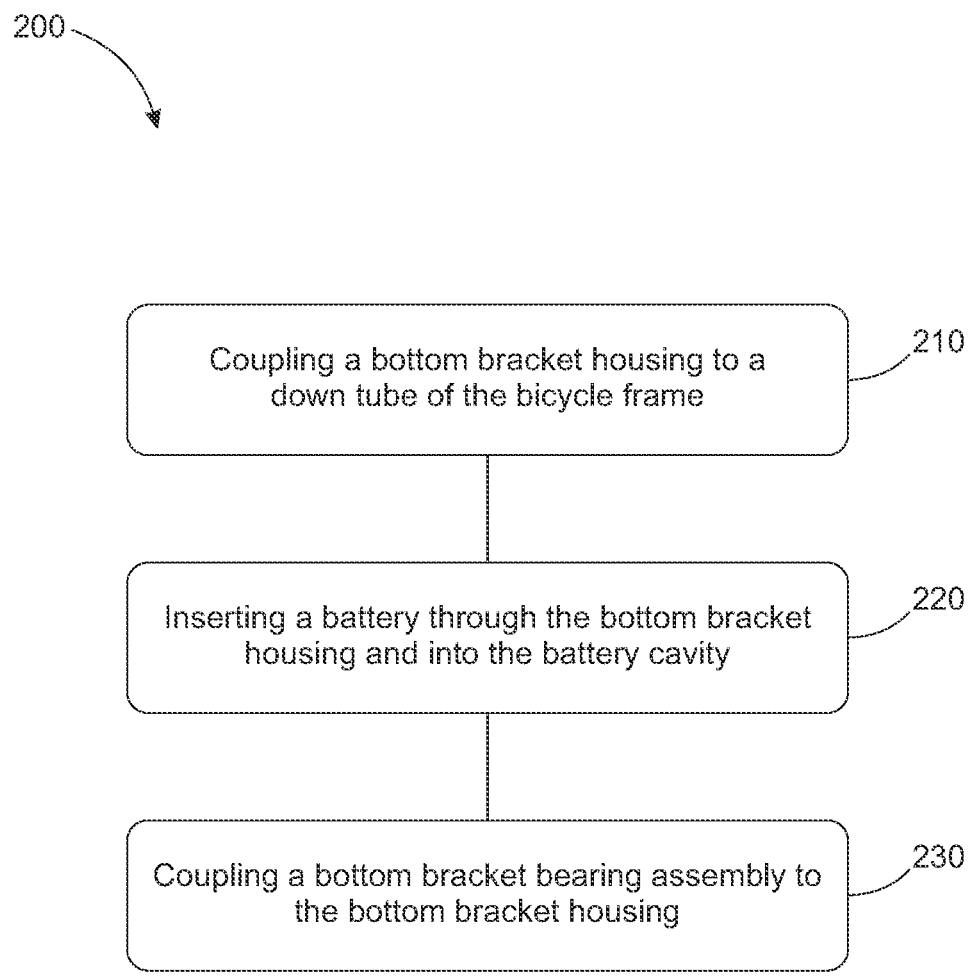
FIG. 7 illustrates a method of mounting a battery to a bicycle frame.

FIG. 7 illustrates a method 200 of mounting a battery to a bicycle frame. Method 200 includes an act 210 of coupling a bottom bracket housing to a down tube of the bicycle frame. The bottom bracket housing includes a hollow cylindrical shaped housing shell having a housing first end, a housing second end opposing the housing first end, a bearing cavity inside the housing shell, and a housing shell longitudinal axis that extends from the housing first end to the housing second end. The down tube includes a hollow down tube shell having a down tube first end, a down tube second end opposing the down tube first end, a battery cavity inside the hollow down tube shell, and a down tube longitudinal axis that extends from the down tube first end to the down tube second end. The housing shell longitudinal axis is perpendicular to the down tube longitudinal axis. The bearing cavity opens to the battery cavity.

Method 200 also includes an act 220 of inserting the battery through the bottom bracket housing and into the battery cavity.

Method 200 includes an act 230 of coupling a bottom bracket bearing assembly to the bottom bracket housing. The battery is prevented from exiting the battery cavity in response to the bottom bracket bearing assembly being coupled to the bottom bracket housing. In some embodiments, coupling the bottom bracket bearing assembly to the bottom bracket housing includes extending a male bearing cup through a first bearing opening in the bottom bracket housing along the housing shell longitudinal axis. In some embodiments, coupling the bottom bracket bearing assembly to the bottom bracket housing includes extending a female bearing cup through a second bearing opening in the bottom bracket housing along the housing shell longitudinal axis. In some embodiments, coupling the bottom bracket bearing assembly to the bottom bracket housing includes coupling the female bearing cup and the male bearing cup to each other.

Method 200 can include many other acts. In some embodiments, method 200 includes electrically coupling the battery to a charging connector, where the charging connector is electrically coupled to a charging port mounted to the down tube. In some embodiments, the bottom bracket housing is coupled to the down tube second end. In some embodiments, the battery is inserted through a through opening into the bottom bracket housing and into the battery cavity.

In some embodiments, method 200 includes coupling a battery access cover to the bottom bracket housing, where the battery access cover covers the through opening.

The embodiments and examples set forth herein were presented in order to best explain the disclosed invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A bicycle frame comprising:
   a down tube, wherein the down tube comprises a hollow down tube shell having a down tube first end, a down tube second end opposing the down tube first end, a battery cavity inside the hollow down tube shell, and a down tube longitudinal axis that extends from the down tube first end to the down tube second end;
   a battery positioned inside the battery cavity;
   a bottom bracket housing coupled to the down tube second end, wherein the bottom bracket housing comprises a hollow cylindrical shaped housing shell having a housing first end, a housing second end opposing the housing first end, a bearing cavity inside the housing shell, and a housing shell longitudinal axis that extends from the housing first end to the housing second end, wherein the housing shell longitudinal axis is perpendicular to the down tube longitudinal axis, and wherein the bearing cavity opens to the battery cavity; and
   a bottom bracket bearing assembly extending through and coupled to the bottom bracket housing, wherein the bottom bracket bearing assembly prevents the battery from exiting the battery cavity in response to the bottom bracket bearing assembly being coupled to the bottom bracket housing.

2. The bicycle frame of claim 1, wherein the bottom bracket bearing assembly comprises:
   a male bearing cup, wherein the male bearing cup is extended along the housing shell longitudinal axis into a first bearing opening in the housing first end; and
   a female bearing cup, wherein the female bearing cup is extending along the housing shell longitudinal axis through a second bearing opening in the housing second end;
   wherein the male bearing cup is coupled to the female bearing cup to couple the bottom bracket bearing assembly to the bottom bracket housing.

3. The bicycle frame of claim 1, wherein the bicycle frame further comprises:
   a head tube coupled to the down tube first end, wherein a front fork steerer tube is mounted to the head tube;
   a seat tube coupled to the bottom bracket housing, and
   a top tube coupled to the seat tube and the head tube.

4. The bicycle frame of claim 1, further comprising:
   a charging port coupled to down tube outside surface; and
   a charging connector coupled to a down tube inside surface, wherein the charging port and the charging connector are electrically coupled with a charging electrical connection.

5. The bicycle frame of claim 4, wherein the battery is electrically coupled to the charging connector in response to the battery being inserted into the battery cavity.

6. The bicycle frame of claim 1, wherein the battery is inserted into the battery cavity through a through opening in the bottom bracket housing.

7. The bicycle frame of claim 6, further comprising a battery access cover coupled to the bottom bracket housing, wherein the battery access cover covers the through opening.

8. A bicycle frame comprising:
   a down tube, wherein the down tube is hollow, and wherein a battery is enclosed in the down tube; and
   a bottom bracket housing coupled to a down tube second end, wherein the bottom bracket housing is hollow;
   a through opening in the bottom bracket housing, wherein the battery is inserted into the down tube through the through opening; and
   a bottom bracket bearing assembly extending through and coupled to the bottom bracket housing, wherein the bottom bracket bearing assembly prevents the battery from exiting the down tube in response to the bottom bracket bearing assembly being coupled to the bottom bracket housing.

9. The bicycle frame of claim 8, wherein the bottom bracket bearing assembly comprises:
   a male bearing cup, wherein the male bearing cup is extended into a first bearing opening in a bottom bracket housing first end along a housing shell longitudinal axis of the bottom bracket housing; and
   a female bearing cup, wherein the female bearing cup is extended through a second bearing opening in a bottom bracket housing second end along the housing shell longitudinal axis;
   wherein the male bearing cup is coupled to the female bearing cup to couple the bottom bracket bearing assembly to the bottom bracket housing.

10. The bicycle frame of claim 9, wherein a longitudinal axis of the down tube is perpendicular to the housing shell longitudinal axis.

11. The bicycle frame of claim 8, further comprising a charging port coupled to the down tube, wherein the charging port is electrically coupled to a charging connector inside the down tube.

12. The bicycle frame of claim 11, wherein the battery is electrically coupled to the charging connector in response to inserting the battery into the down tube through the through opening.

13. The bicycle frame of claim 8, wherein the bicycle frame further comprises:
   a head tube coupled to the down tube, wherein a front fork steerer tube is mounted to the head tube;
   a seat tube coupled to the bottom bracket housing, and
   a top tube coupled to the seat tube and the head tube.

14. The bicycle frame of claim 8, further comprising a battery access cover coupled to the bottom bracket housing, wherein the battery access cover covers the through opening.

15. A method of mounting a battery to a bicycle frame comprising:
   coupling a bottom bracket housing to a down tube of the bicycle frame, wherein the bottom bracket housing comprises a hollow cylindrical shaped housing shell having a housing first end, a housing second end opposing the housing first end, a bearing cavity inside the housing shell, and a housing shell longitudinal axis that extends from the housing first end to the housing second end, and the down tube comprises a hollow down tube shell having a down tube first end, a down tube second end opposing the down tube first end, a battery cavity inside the hollow down tube shell, and a down tube longitudinal axis that extends from the down tube first end to the down tube second end, wherein the housing shell longitudinal axis is perpendicular to the down tube longitudinal axis, and wherein the bearing cavity opens to the battery cavity;
   inserting the battery through the bottom bracket housing and into the battery cavity; and
   coupling a bottom bracket bearing assembly to the bottom bracket housing, wherein the battery is prevented from exiting the battery cavity in response to the bottom bracket bearing assembly being coupled to the bottom bracket housing.

16. The method of claim 15, wherein the coupling the bottom bracket bearing assembly to the bottom bracket housing comprises:
   extending a male bearing cup through a first bearing opening in the bottom bracket housing along the housing shell longitudinal axis;
   extending a female bearing cup through a second bearing opening in the bottom bracket housing along the housing shell longitudinal axis; and
   coupling the female bearing cup and the male bearing cup to each other.

17. The method of claim 15, further comprising electrically coupling the battery to a charging connector, wherein the charging connector is electrically coupled to a charging port mounted to the down tube.

18. The method of claim 15, wherein the bottom bracket housing is coupled to the down tube second end.

19. The method of claim 15, wherein the battery is inserted through a through opening into the bottom bracket housing and into the battery cavity.

20. The method of claim 19, further comprising coupling a battery access cover to the bottom bracket housing, wherein the battery access cover covers the through opening.

\* \* \* \* \*